United States Patent [19]

Immel et al.

[11] Patent Number: 5,552,362
[45] Date of Patent: Sep. 3, 1996

[54] CATALYSTS FOR THE REMOVAL OF SULFUR COMPOUNDS FROM INDUSTRIAL GASES, A PROCESS FOR THEIR PRODUCTION AND THEIR USE

[75] Inventors: Otto Immel, Krefeld; Harald Müller, Dormagen, both of Germany

[73] Assignee: Bayer Aktiengesellschaft, Leverkusen, Germany

[21] Appl. No.: 325,251

[22] PCT Filed: Apr. 16, 1993

[86] PCT No.: PCT/EP93/00917

§ 371 Date: Oct. 20, 1994

§ 102(e) Date: Oct. 20, 1994

[87] PCT Pub. No.: WO93/22052

PCT Pub. Date: Nov. 11, 1993

[51] Int. Cl.$^6$ .................... B01J 23/24; B01J 8/00
[52] U.S. Cl. .................... 502/308; 502/311; 502/323; 502/324; 502/353; 423/244.02
[58] Field of Search .................... 502/302, 305, 502/308, 323, 324, 353, 311; 423/244.02

[56] References Cited

U.S. PATENT DOCUMENTS

| | | | |
|---|---|---|---|
| 3,845,197 | 10/1974 | Renault et al. | 423/575 |
| 3,957,690 | 5/1976 | Bobolev et al. | 252/464 |
| 4,233,139 | 11/1980 | Murrell et al. | 208/112 |
| 4,269,737 | 5/1981 | Grenoble et al. | 252/464 |
| 4,337,175 | 6/1982 | Ramirez | 252/455 R |
| 4,376,732 | 3/1983 | Ramirez | 260/239 E |
| 4,399,112 | 8/1983 | Voirin | 423/230 |
| 4,957,718 | 9/1990 | Yoo et al. | 423/244 |
| 4,968,660 | 11/1990 | Tijburg et al. | 502/303 |
| 4,982,033 | 1/1991 | Chu et al. | 585/419 |

FOREIGN PATENT DOCUMENTS

| | | |
|---|---|---|
| 1667590 | 12/1975 | Germany . |
| 2107313 | 4/1990 | Japan . |
| 1425631 | 2/1976 | United Kingdom . |

*Primary Examiner*—Shrive Beck
*Assistant Examiner*—Timothy H. Meeks
*Attorney, Agent, or Firm*—Joseph C. Gil; Lyndanne M. Whalen

[57] ABSTRACT

Catalysts useful for the removal of volatile sulfur compounds from industrial gases composed of an inorganic, abrasion-resistant, incombustible support which is uniformly impregnated with either (a) an oxide or hydroxide of niobium or tantalum or (b) an oxide or hydroxide of manganese and an oxide or hydroxide of hafnium, lanthanum or an element in the Lanthanide Series of Elements.

24 Claims, No Drawings

CATALYSTS FOR THE REMOVAL OF SULFUR COMPOUNDS FROM INDUSTRIAL GASES, A PROCESS FOR THEIR PRODUCTION AND THEIR USE

BACKGROUND OF THE INVENTION

This invention relates to catalysts with which volatile sulfur compounds can be removed substantially completely from industrial gases, to a process for the production of these catalysts and to their use for the removal of sulfur compounds from industrial gases.

Sulfur-containing compounds such as, for example, carbon oxysulfide, carbon disulfide and hydrogen sulfide are common impurities of industrial gases such as, for example, carbon monoxide, carbon dioxide, nitrogen, methane and natural gas. They are formed, for example, in the processing of sulfur-containing gaseous, liquid or solid starting materials, such as natural gas, petroleum, coke and coal.

The removal of such sulfur-containing constituents from industrial gases is often necessary, for example in view of catalyst damage, corrosion, unwanted secondary reactions in the organic and inorganic synthesis and also in view of the high toxicity of the sulfur-containing components, even in low concentrations.

Whereas hydrogen sulfide as the most common impurity of carbon oxysulfide and carbon disulfide can be removed from gases by a number of known processes, the simultaneous removal of carbon oxysulfide and carbon disulfide from gases is problematical.

Adsorbents, such as active charcoal, zeolites or silica gel, are generally known to have only a very low adsorption capacity for carbon oxysulfide and carbon disulfide. The purification of gases, for example by washing with liquid basic media, involves considerable effort because the solubility of carbon oxysulfide and carbon disulfide in such media is minimal. In addition, working up of the spent solutions involves environmental problems.

According to JP 247 084, heavy metals of the first, second and eighth secondary groups of the periodic system and lanthanide elements are added to lignite as a support material. The catalyst obtained in this way is capable of adsorbing sulfur-containing compounds from industrial gases and desorbing them again at a later stage. In this case, however, the sulfur-containing components do not react chemically to form sulfur compounds readily removable from a gas mixture, so that desorption of the sulfur-containing components leaves a gas mixture enriched with toxic sulfur compounds which is ecologically undesirable.

Processes in which carbon oxysulfide and carbon disulfide are converted into hydrogen sulfide on solid media, generally zeolites, aluminium oxide and the like, and the hydrogen sulfide formed is subsequently removed from the gas mixture by known methods have been adopted for practical application.

The disadvantage of such processes lies in their high energy consumption because the conversion of carbon oxysulfide or carbon disulfide only takes place at high temperatures, generally of the order of 400° to 800° C.

A process for the removal of carbon oxysulfide from gases which is known from DE-A-1 667 590 uses certain heavy metal oxides as catalysts on active charcoal as support. This process has many disadvantages on account of the abrasion of the charcoal and its combustibility.

In addition, it is known from DE-A 2 203 494 that aluminium oxide containing molybdenum, iron, tungsten, nickel or cobalt or certain combinations of these metals can be used as a catalyst for the reaction of carbon oxysulfide with steam. These metals are generally used in the form of sulfides. However, uneconomically high temperatures of 250° to 400° C. are required for the hydrolytic reaction of carbon oxysulfide and carbon disulfide.

SUMMARY OF THE INVENTION

Accordingly, the problem addressed by the present invention was to provide catalysts which would enable sulfur compounds to be removed substantially completely from gases without any of the disadvantages mentioned above.

Surprisingly, this problem has been solved by the catalysts according to the invention.

DESCRIPTION OF THE PREFERRED EMBODIMENTS

The present invention relates to catalysts for the removal of volatile sulfur compounds from industrial gases, the catalysts consisting of an inorganic, abrasion-resistant, incombustible support which is uniformly impregnated with oxides/hydroxides of the elements from the niobium and tantalum group and optionally with oxides/hydroxides of elements of the second main group of the periodic system or with oxides/hydroxides of manganese and with at least one oxide/hydroxide of elements from the hafnium, lanthanum and lanthanides group and optionally with oxides/hydroxides of elements from the tungsten and molybdenum group.

Preferred catalysts are those of which the inorganic support consists of aluminium oxide, magnesium oxide, a spinel, more particularly magnesium-aluminium oxide, a zeolite or mica and has a surface of 10 to 500 $m^2/g$.

In one preferred embodiment, the inorganic support contains the oxides/hydroxides of the elements in a quantity of 0.05 to 6% by weight and preferably 0.1 to 3% by weight, based on the quantity of the support material.

The inorganic support is preferably uniformly impregnated with oxides/hydroxides of manganese and with at least one oxide/hydroxide of the elements from the group comprising La, Ce, Pr, Nd, En, Gd, Tb, Dy, Yb and Lu and optionally with oxides/hydroxides of the elements from the tungsten and molybdenum group.

In one particularly preferred embodiment, the inorganic support is uniformly impregnated with oxides/hydroxides of manganese and with at least one oxide/hydroxide of the elements from the La, Ce, Pr and Nd group and optionally with oxides/hydroxides of the elements from the tungsten and molybdenum group.

The present invention also relates to a process for the production of the catalysts according to the invention which is characterized in that the inorganic support is initially introduced in granular form with an average diameter of 0.1 to 20 mm and preferably 1 to 10 mm, uniformly treated with aqueous solutions of compounds of the elements, dried and heated at 200° to 500° C. and preferably at 280° to 450° C.

Aqueous solutions of nitrates and/or acetates of the elements and ammonium salts and/or alkali metal salts of the molybdates and tungstates are preferably used.

In one preferred variant of the process, the support is successively treated with several solutions containing one or more compounds and optionally dried after each treatment.

The aqueous solutions of the compounds are preferably uniformly applied by immersion of the support in the corresponding solutions or by spraying of the support with the corresponding aqueous solutions.

The catalysts according to the invention are used for the substantially complete removal of sulfur compounds, more particularly COS, $CS_2$ and organic sulfur compounds, more particularly mercaptans, from industrial gases, more particularly methane, $CO_2$, $N_2$, CO and natural gas.

Where the catalysts according to the invention are used for the removal of sulfur compounds from industrial gases, the industrial gases to be purified are preferably a) charged with steam and then
b) passed over a catalyst according to the invention at temperatures of 20° to 185° C and preferably at temperatures of 20° to 80° C. and
c) are then freed from the hydrogen sulfide formed in b) and from the hydrogen sulfide present in the gas from the outset.

The hydrogen sulfide is preferably removed in c) by passing the gases b) together with air and/or oxygen over a catalyst according to the invention at temperatures of 15° to 180° C. and preferably at temperatures of 20° to 80° C. and regenerating the catalyst, preferably with steam, to remove the sulfur formed in c) from the catalyst.

The purification of the industrial gases preferably takes place under low pressures, more particularly in the range from 0.9 to 3 bar.

The catalysts provide for the quantitative removal of the sulfur-containing compounds mentioned above from gases at low temperatures and over very short residence times, so that economy is improved by longer useful lives and higher safety standards.

In the process according to the invention for the purification of gases, for example, a catalytic reaction of gases to be purified, for example containing carbon oxysulfide or carbon disulfide, is carried out in a reactor known as a hydrolysis tower, which consists of a heatable reaction tower with a bed of the catalyst according to the invention, the sulfur compounds being converted into hydrogen sulfide. The hydrogen sulfide thus formed and any hydrogen sulfide already present in the gas is then oxidized in the presence of air to elemental sulfur, for example in another reactor consisting of a reaction tower known as an oxidation tower with a bed of the catalyst according to the invention.

The element sulfur accumulating during the oxidation in the oxidation tower may readily be removed from the oxidation tower with hot steam. The catalyst bed is not affected by this treatment.

To produce the catalyst, the commercial support may be used in powder form or in particulate form. For a fixed-bed process, the catalyst is used in particulate form, for example in the form of extrudates, pills, pellets or beads with dimensions of, preferably, 0.1 to 20 mm.

In the production of the catalyst according to the invention, for example, the inorganic support, preferably $\gamma$-$Al_2O_3$, is charged with compounds of the corresponding elements. The support thus charged is then dried and heated to 200° to 500° C. and preferably to 280° to 450° C. The elements mentioned may be applied to the inorganic support, for example, by impregnation or spraying with suitable salt solutions of these elements, followed by a drying phase and by the complete heating phase. Drying is carried out in known manner at 80° to 130° C., optionally in a vacuum drying unit. In the subsequent heating phase, the compounds applied are converted into oxides/hydroxides which adhere firmly to the inorganic support. However, the elements mentioned may also be applied by co-precipitation of a hydroxide mixture from salts of the above-mentioned elements onto the support using basic compounds such as, for example, alkali metal hydroxide or ammonia, optionally followed by washing of the soluble components with water. Suitable salts of the elements mentioned are, in particular, the acetates, chlorides, nitrates and sulfates. The subsequent drying and heating in the temperature ranges mentioned takes place over a period of 1 to 100 hours and preferably over a period of 2 to 20 hours or over a period of 1 to 12 hours and more particularly over a period of 2 to 6 hours, during which the temperature may even be increased within the ranges mentioned above.

The inorganic support may also be impregnated with an aqueous solution in which all the elements are dissolved in the form of their salts. However, the elements may also be successively applied to the support either individually or in certain combinations by successively using the corresponding solutions. After each impregnation, the catalyst may be dried so that it has sufficient absorbency for the following impregnation.

A particularly effective catalyst for the purification of gases in accordance with the invention is obtained using $\gamma$-$Al_2O_3$ granules which are impregnated with a solution of a niobium compound in such a quantity that the catalyst formed has a niobium content of 0.2 to 6% by weight and preferably 0.5 to 4% by weight. To produce the catalyst, niobic acid ($Nb_2O_5 \cdot nH_2O$) and $Al_2O_3$ may be mixed in powder form and the resulting mixture converted into pellets. Niobic acid and aluminium oxide may be used in a quantitative ratio of 5:95 to 95:5 and preferably in a quantitative ratio of 10:90 to 80:20. Instead of niobium compounds, the corresponding tantalum compounds or mixtures of niobium and tantalum may also be used. In a preferred embodiment, the niobic acid used contains tantalic acid emanating from its natural origin in a quantity of 0,001 to 10 mol-%, based on the total mols of niobic and tantalic acid.

An addition of Ca, Mg, Sr and/or Ba in the form of their oxides or hydroxides is suitable for the after-treatment of the niobium/tantalum catalysts. To this end, the catalyst is impregnated with a corresponding solution of alkaline earth metal compounds. The nitrates of the alkaline earth metals are advantageously used for this purpose because they decompose on heating to relatively high temperatures. The alkaline earth metals are applied to the catalyst in such a quantity that the total alkaline earth metal content is preferably 0.5 to 5% by weight. The percentage content of the individual alkaline earth metals may be varied as required.

Another particularly effective catalyst for the purification of gases in accordance with the invention is obtained by applying compounds of cerium and manganese to $\gamma$-$Al_2O_3$ in the form of extrudates and heating the support thus charged after drying to temperatures of 200° to 450° C. The support thus charged is then additionally impregnated or sprayed with a solution of a tungsten salt, followed by another drying phase and then by heating at 200° to 450° C.

The following Examples are intended to illustrate the invention without limiting it in any way.

Production of the Catalyst

Example 1

1,000 g of a commercial $\gamma$-$Al_2O_3$ with a specific surface of 350 $m^2/g$ and a mean particle diameter of 2 to 5 mm are impregnated with a solution consisting of 62 g of $Ce(NO_3)_3 \cdot 6H_2O$, 91.5 g of $Mn(NO_3)_2 \cdot 4H_2O$ and 375 g of water. After intermediate drying at 90° to 100° C., the spherical catalyst particles are treated with an equivalent quantity of sodium hydroxide to precipitate the cerium and manganese compounds onto the aluminium oxide. The spherical catalyst particles were then washed free from nitrate and redried. The catalyst was then heated for 3 h at 400° C.

200 g of the catalyst thus produced was additionally impregnated with a solution which had been prepared from 4.2 g of $Na_2WO_4.2H_2O$ and 75 g of water. The catalyst was then dried for 18 h at 120° C. in a water jet vacuum and subsequently heated for 3 h at 400° C. The catalyst thus produced is used for converting the sulfur compounds present in industrial gases (for conditions, see Table 1 and test procedure).

Example 2

400 g of a commercial $\gamma$-$Al_2O_3$ with a specific surface of 350 m²/g and a particle diameter of 2 to 6 mm were impregnated with a solution which had been prepared from 25 g of $La(NO_3)\cdot 6H_2O$, 35.7 g of $Mn(CH_3COO)_2.4H_2O$ and 80 g of distilled water. The aluminium oxide thus impregnated was then dried for 18 hours at 100° C. in a water jet vacuum and subsequently heated for 4 hours at 400° C.

The catalyst thus produced is used for the purification of industrial gases (for conditions, see Table 2 and test procedure).

Example 3

400 g of the same $Al_2O_3$ granules as in Example 1 are impregnated with a niobium pentachloride solution which had been prepared as follows: 11.64 g of $NbCl_5$ and 11.64 g of NaCl were first dissolved with 30 g of water on a steam bath and the resulting solution was subsequently diluted with another 70 g of water. After intermediate drying at 100° C. in a water jet vacuum, the $NbCl_5$-impregnated aluminium oxide was impregnated for 1 hour with 418 g of an aqueous 2.2% $NH_3$ solution and washed with water until free from chloride. After further intermediate drying, 200 g of the aluminium oxide thus pretreated were impregnated with a solution which had been prepared from 11.8 g of $Ca(NO_3)_2\cdot 4H_2O$, 21.1 g of $Mg(NO3)_2\cdot 6H_2O$ and 30 g of water. The aluminium oxide was then dried for 18 hours at 100° C. in a water jet vacuum and subsequently heated for 4 hours at 400° C.

Example 4

40 g of niobic acid powder, 160 g of $\gamma$-$Al_2O_3$ powder, specific surface 350 m²/g, and 7 g of graphite powder were intensively mixed and converted into 5 mm diameter pellets.

Example 5

1,000 g of a commercial $\gamma$-$Al_2O_3$ with a specific surface of 350 m²/g and a particle diameter of 2 to 5 mm were impregnated with a solution consisting of 62 g of $Ce(NO_3)_3\cdot 6H_2O$, 91.5 g of $Mn(NO_3)_2\cdot 4H_2O$ and 375 g of water. After intermediate drying at 90° to 100° C., the catalyst beads were treated with an equivalent quantity of sodium hydroxide to precipitate the cerium and manganese on the aluminium oxide. The spherical catalyst particles were then washed free from nitrate and redried. The catalyst was then heated for 3 hours at 400° C.

Purification of the Gases (Test Procedure)

The gas to be purified is first passed through a water-filled tank and saturated with steam. The exact gas composition (1) of the gas to be converted is determined by means of a gas chromatograph. The gas is then introduced into a hydrolysis tower (500 ml). The hydrolysis tower consists of a double-walled vessel, the temperature of the reaction tower being controllable by means of a liquid, and is filled with catalyst according to the invention. The converted gas leaves the hydrolysis tower. Its composition is then measured (2). The gas to be purified then enters an oxidation tower (500 ml). The oxidation tower has the same construction as the described hydrolysis tower and is filled with the same catalyst according to the invention. At the same time, air is introduced into the oxidation tower in an at least stoichiometric quantity, based on oxygen and hydrogen sulfide.

The gas now freed from the sulfur-containing compounds leaves the oxidation tower and is tested for purity (3) (see Tables 1 to 5).

In general, 200 to 400 ml of catalyst were used.

TABLE 1

Catalyst according to Example 1
Industrial gas: $N_2$

| | | | Concentration in the gas | | | |
|---|---|---|---|---|---|---|
| Gas | Temperature during | | of | of | of | |
| through-put [1/h] | conversion [°C.] | oxidation [°C.] | COS at (1) [vpm] | COS at (2) [vpm] | COS at (3) [vpm] | of $H_2S$ at (3) [vpm] |
| 300 | 35 | 35 | 9068 | 3244 | 107 | ≦10 |
| 300 | 40 | 40 | 9068 | 2166 | ≦10 | ≦10 |
| 300 | 48 | 48 | 9068 | 964 | ≦10 | ≦10 |
| 300 | 60 | 69 | 8988 | ≦10 | ≦10 | ≦10 | vpm - volume parts per million
at (1) - concentration of COS before conversion
at (2) - concentration of COS after conversion
at (3) - concentration of COS and $H_2S$ after oxidation

TABLE 2

Catalyst according to Example 2
Industrial gas: $N_2$

| | | | Concentration in the gas | | | |
|---|---|---|---|---|---|---|
| Gas | Temperature during | | of | of | of | |
| through-put [1/h] | conversion [°C.] | Oxidation [°C.] | COS at (1) [vpm] | COS at (2) [vpm] | COS at (3) [vpm] | of $H_2S$ at (3) [vpm] |
| 300 | 32 | 55 | 9704 | 6360 | 301 | 74 |
| 300 | 57 | 57 | 9705 | 732 | ≦10 | ≦10 |
| 300 | 63 | 63 | 9705 | ≦10 | ≦10 | ≦10 |

TABLE 3

Catalyst according to Example 3
Industrial gas: $N_2$

| | | | Concentration in the gas | | | |
|---|---|---|---|---|---|---|
| Gas | Temperature during | | of | of | of | |
| through-put [1/h] | conversion [°C.] | Oxidation [°C.] | COS at (1) [vpm] | COS at (2) [vpm] | COS at (3) [vpm] | of $H_2S$ at (3) [vpm] |
| 300 | 45 | 45 | 10263 | 3552 | 54 | ≦10 |
| 300 | 60 | 60 | 10458 | 439 | ≦10 | ≦10 |
| 300 | 65 | 65 | 10193 | ≦10 | ≦10 | ≦10 |

TABLE 4

Catalyst according to Example 4
Industrial gas: N₂

| Gas through-put [1/h] | Temperature during conver-sion [°C.] | Oxidation [°C.] | Concentration in the gas | | | |
|---|---|---|---|---|---|---|
| | | | of COS at (1) [vpm] | of COS at (2) [vpm] | of COS at (3) [vpm] | of H₂S at (3) [vpm] |
| 300 | 50 | 50 | 8927 | 2124 | 102 | ≦10 |
| 300 | 65 | 65 | 9039 | 589 | ≦10 | ≦10 |
| 300 | 70 | 70 | 9039 | ≦10 | ≦10 | ≦10 |

TABLE 5

Catalyst according to Example 5
Industrial gas: N₂

| Gas through-put [1/h] | Temperature during conver-sion [°C.] | oxidation [°C.] | Concentration in the gas | | | |
|---|---|---|---|---|---|---|
| | | | of COS at (1) [vpm] | of COS at (2) [vpm] | of COS at (3) [vpm] | of H₂S at (3) [vpm] |
| 300 | 70 | 70 | 9835 | 1098 | 103 | ≦10 |
| 300 | 90 | 90 | 9835 | 220 | ≦10 | ≦10 |
| 300 | 110 | 110 | 9635 | ≦10 | ≦10 | ≦10 |

As the test results show, the sulfur compound COS, for example, is converted substantially completely into H₂S by the catalyst according to the invention so that, as H₂S, it can then be oxidized substantially completely to sulfur and hence removed from the gas. The sulfur adheres to the material (for example to the catalyst according to the invention) in the oxidation tower where it can be simply driven out with steam without damaging the material.

We claim:

1. A catalyst for the removal of volatile sulfur compounds from industrial gases comprising an inorganic, abrasion-resistant, incombustible support that is uniformly impregnated with
   (a) an oxide or hydroxide of
      (1) manganese and
      (2) hafnium and
   (b) an oxide or hydroxide of
      (3) tungsten or
      (4) molybdenum.

2. The catalyst of claim 1 in which the inorganic support is selected from the group consisting of aluminum oxide, magnesium oxide, spinels, zeolites and mica.

3. The catalyst of claim 2 in which the inorganic support has a surface area of from 10 to 500 m²/g.

4. The catalyst of claim 1 in which the inorganic support is a magnesium-aluminum oxide.

5. The catalyst of claim 4 in which the inorganic support has a surface area of from 10 to 500 m²/g.

6. The catalyst of claim 1 in which the total amount of oxide and/or hydroxide (a) present is from about 0.05 to about 6% by weight based on the weight of the inorganic support material.

7. The catalyst of claim 1 in which the total amount of oxide and/or hydroxide (a) present is from about 0.1 to about 3% by weight, based on the weight of the inorganic support material.

8. A process for the production of the catalyst of claim 1 comprising (a) treating the inorganic support which is in granular form with an aqueous solution of
   (1) a compound of
      (i) manganese and
      (ii) hafnium which is capable of forming an oxide and/or hydroxide and
   (2) a compound of tungsten or molybdenum which is capable of forming an oxide or hydroxide
in a manner such that the support will be uniformly impregnated with the aqueous solution, b) drying the impregnated support and c) heating the impregnated support to a temperature of from about 200° to about 500° C.

9. The process of claim 8 in which the granular support has an average diameter of from about 0.1 to about 20 mm.

10. The process of claim 8 in which the granular support has an average diameter of from about 1 to about 10 mm.

11. The process of claim 8 in which step c) is carried out at a temperature of from about 280 to about 450° C.

12. A process for the production of a catalyst for the removal of volatile sulfur compounds from industrial gases comprising a) treating an inorganic, abrasion-resistant, incombustible support which is granular in form with an aqueous solution of
   (1) a compound of niobium or tantalum which is capable of forming niobium oxide or niobium hydroxide or tantalum oxide or tantalum hydroxide, or
   (2) a compound of
      (i) manganese and
      (ii) hafnium, lanthanum or an element of the Lanthanide Series of the Periodic System of Elements which is capable of forming an oxide and/or hydroxide, and
   (3) at least one nitrate, sulfate, chloride, oxide, hydroxide, acetate, ammonium salt or alkali metal salt of a molybdate or tungstate.

13. The process of claim 8 in which the support is successively treated with two or more solutions containing at least one required oxide and/or hydroxide.

14. The process of claim 13 in which the support is dried after each of the successive treatments.

15. The process of claim 8 in which step a) is carried out by immersing the support in the aqueous solution.

16. The process of claim 8 in which step a) is carried out by spraying the support with the aqueous solution.

17. A process for removing sulfur compounds from an industrial gas comprising contacting a sulfur compound-containing industrial gas with a catalyst comprising an inorganic, abrasion-resistant, incombustible support that is uniformly impregnated with
   (a) niobium oxide, niobium hydroxide, tantalum oxide or tantalum hydroxide or
   (b) an oxide or hydroxide of
      (i) manganese and
      (ii) hafnium, lanthanum or an element from the Lanthanide Series of the Periodic System of Elements.

18. A process for removing COS, CS₂ and organic sulfur compounds from methane, carbon dioxide, nitrogen, carbon monoxide or natural gas comprising contacting the methane, carbon dioxide, nitrogen, carbon monoxide or natural gas with a catalyst comprising an inorganic, abrasion-resistant, incombustible support that is uniformly impregnated with
   (a) niobium oxide, niobium hydroxide, tantalum oxide or tantalum hydroxide or (b) an oxide or hydroxide of
  (i) manganese and
  (ii) hafnium, lanthanum or an element from the Lanthanide Series of the Periodic System of Elements.

19. A process for removing sulfur compounds from an industrial gas comprising
  a) charging the industrial gas with steam,
  b) passing the gas from a) over a catalyst comprising an inorganic, abrasion-resistant, incombustible support that is uniformly impregnated with
    (1) niobium hydroxide, niobium oxide, tantalum oxide or tantalum hydroxide or
    (2) an oxide or hydroxide of
      (i) manganese and
      (ii) hafnium, lanthanum or an element from the Lanthanide Series of the Periodic System of Elements at a temperature of from about 20° to about 185° C., and
  c) removing hydrogen sulfide.

20. The process of claim 19 in which step b) is carried out at a temperature of from about 20° to about 800° C.

21. The process of claim 19 in which step c) is carried out by mixing the gas from b) with air and/or oxygen and passing this mixture over the catalyst at a temperature of from about 15° to about 180° C.

22. The process of claim 19 in which step c) is carried out by mixing the gas from b) with air and/or oxygen and passing this mixture over the catalyst at a temperature of from about 20° to about 80° C.

23. The process of claim 19 in which the catalyst used in b) is regenerated with steam.

24. The process of claim 19 in which each of steps a), b) and c) is carried out at a pressure of from about 0.9 to about 3 bar.

* * * * *